United States Patent [19]

Ferment

[11] Patent Number: 5,650,243
[45] Date of Patent: Jul. 22, 1997

[54] BATTERY PACKAGING CONSTRUCTION USING FLEXIBLE PLASTIC BARRIER STRUCTURES

[76] Inventor: George R. Ferment, c/o Lithium Technology Corporation, 5115 Campus Dr., Plymouth Meeting, Pa. 19462

[21] Appl. No.: 585,847

[22] Filed: Jan. 16, 1996

[51] Int. Cl.$^6$ .................................................. H01M 2/02
[52] U.S. Cl. ........................ 429/162; 429/177; 429/185
[58] Field of Search ................................. 429/162, 177, 429/185, 156, 158; 428/57, 58

[56] References Cited

U.S. PATENT DOCUMENTS

| | | | |
|---|---|---|---|
| 2,995,614 | 8/1961 | Krueger | 429/158 |
| 3,874,979 | 4/1975 | Hannon | 428/57 X |
| 5,066,555 | 11/1991 | Tamminen | 429/158 X |
| 5,378,557 | 1/1995 | Murata et al. | 429/162 X |

*Primary Examiner*—Stephen Kalafut
*Attorney, Agent, or Firm*—Zachary T. Wobensmith, III

[57] ABSTRACT

Battery packaging construction of flexible plastic barrier structures which are useful for battery cells or battery packs, to protect the active battery components from outside contamination. One or more battery cells or packs are packaged between multi-layered barrier structures which may be extruded or laminated construction, are joined by heat sealing, and each include at least a first layer which is a sealant layer, a second layer which is a water vapor barrier layer, a third layer which is an oxygen barrier layer, and an outside layer, which can be one of the above layers, or a separate layer to provide increased mechanical strength to the package.

10 Claims, 1 Drawing Sheet

5,650,243

BATTERY PACKAGING CONSTRUCTION USING FLEXIBLE PLASTIC BARRIER STRUCTURES

BACKGROUND OF THE INVENTION

1. Field of the Invention

Battery packaging construction of the type wherein a flat battery cell or pack is encased in a multi-layered flexible plastic structure to provide water vapor, oxygen and other protection to the battery cell or pack components.

2. Description of the Prior Art

There have been many structures proposed for packaging battery cells and packs. The packaging of alkali metal batteries to protect the active components from outside contamination and damage requires special consideration due to the nature of the active components. The nature of the packaging is therefore determined to some extent by the nature of the components.

Alkali metal battery components do not react favorably to the presence of water vapor and other contaminants, which requires that they be assembled and maintained in an inert dry atmosphere. It is also desirable to provide structures that are of recyclable components and materials.

In the U.S. Pat. No. 5,057,385, to Hope et al., battery packaging construction is described which includes a base having an outer layer of metallized mylar plastic on the bottom, a first layer of metal foil with a layer of heat sealable material onto which the battery is placed, and a second layer of metal foil which is placed on top of the battery, which has a layer of heat sealable material in contact with the battery. The heat sealable layers are heated and pressed together to seal the battery therebetween. A frame may also be adhesively secured to the battery. While this structure is satisfactory for many applications, it is bulky, expensive, and requires multiple assembly operations.

For multiple battery packs, it is desirable to be able to deep draw the packaging, which is difficult if the packaging materials are metal.

The battery packaging construction of the invention does not suffer from the prior art problems and provides many positive advantages.

SUMMARY OF THE INVENTION

This invention relates to battery packaging construction for flat battery cells or packs, which construction includes a two sheet barrier structure, with each sheet composed of multiple layers of flexible plastic with at least a sealant layer, a moisture barrier layer, and an oxygen barrier layer. The layers may be co-extruded or laminated to provide the barrier structures, with the battery placed between the layers which are then heat sealed in a dry inert atmosphere.

The principal object of the invention is to provide battery packaging construction which includes at least two sheets of heat sealable barrier structure which are of layered plastic with the layers including a sealant, a moisture barrier and an oxygen barrier layer.

A further object of the invention is to provide battery packaging construction that is all plastic.

A further object of the invention is to provide battery packaging construction that is both protective and recyclable.

A further object of the invention is to provide battery packaging construction that is inexpensive and can be mass produced.

A further object of the invention is to provide battery packaging construction that is particularly suitable for flat battery cells or packs.

A further object of the invention is to provide battery packaging construction that can be easily tailored to meet specific individual packaging and other requirements.

A further object of the invention is to provide battery packaging construction that can be extruded or laminated.

A further object of the invention is to provide battery packaging construction that can be deep drawn without stress.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which.

It should, of course, be understood that the description and drawings herein are merely illustrative and that various modifications and changes can be made in the structures disclosed without departing from the spirit of the invention.

Like numerals refer to like parts throughout the several views.

DESCRIPTION OF THE PREFERRED EMBODIMENTS

When referring to the preferred embodiments, certain terminology will be utilized for the sake of clarity. Use of such terminology is intended to encompass not only the described embodiment, but also technical equivalents which operate and function in substantially the same way to bring about the same result.

Figure 1:
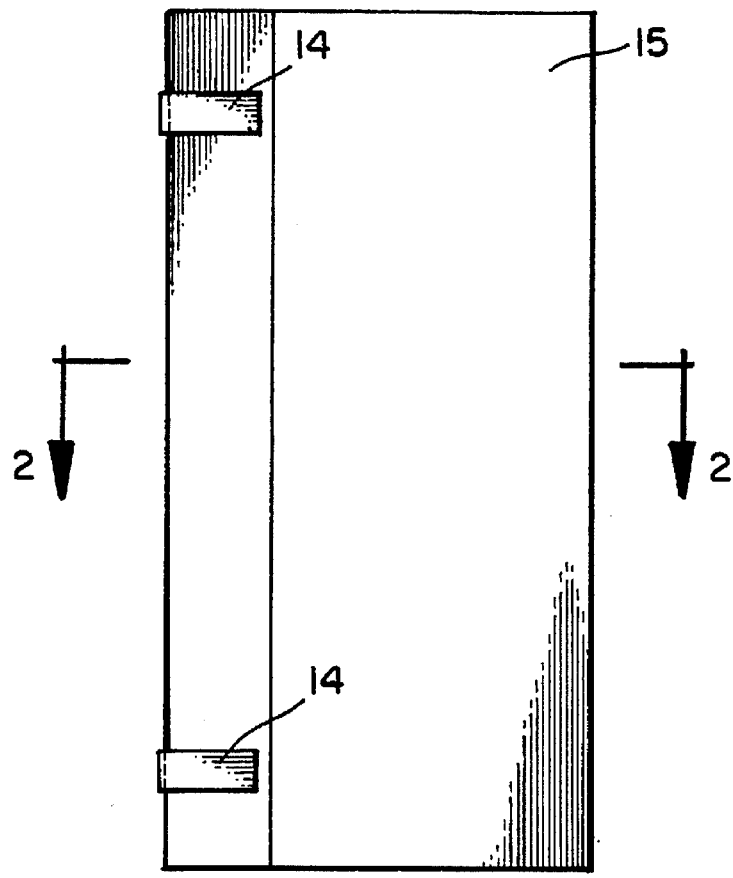
FIG. 1 is a bottom plan view of one embodiment of the battery packaging construction of the invention.
Figure 2:
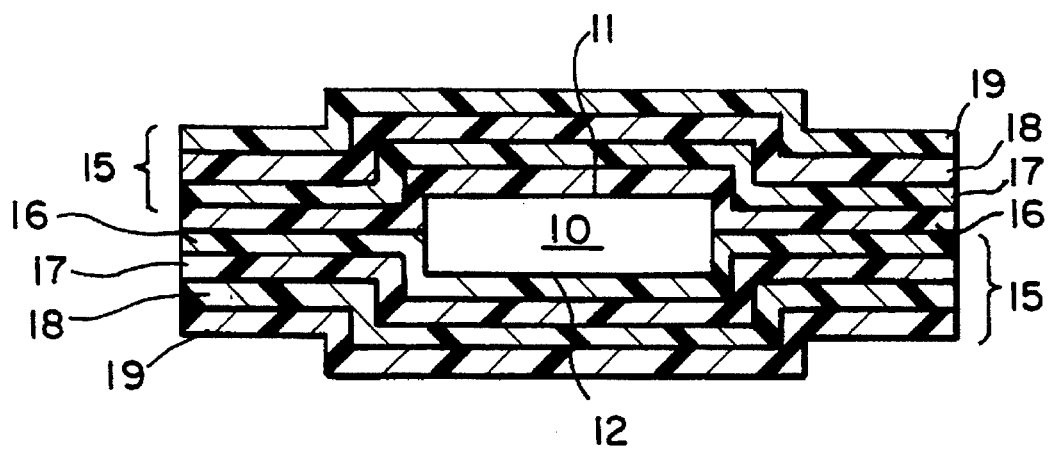
FIG. 2 is a vertical, sectional view taken approximately on the line 2—2 of FIG. 1.

Referring now more particularly to FIGS. 1 and 2 of the drawings, one embodiment of battery packaging construction is therein illustrated.

A flat battery cell 10 is shown which can be of the alkaline or alkaline earth metal type. The cell 10 includes an anode, a cathode and electrolyte (not shown), which cell is of rectangular configuration with a flat top surface 11, a flat bottom surface 12, and terminals 14 of well known type extending therefrom, which can be of metal compatible with the battery components.

The battery 10 has two sheets 15 of plastic barrier structure therearound, each of which is of at least four layers. The sheets 15 each include a sealant layer 16, a first moisture barrier layer 17, an oxygen barrier layer 18 and a second moisture barrier layer 19, which can also act as the outer layer.

The specific materials which make up the layers 16, 17, 18 and 19 are selected according to the nature of the battery components and may be tailored to resist the transmission of specific gases and vapors.

Examples of specific battery packaging construction suitable for an alkaline or alkaline earth metal type battery are described below.

EXAMPLE I

A flat alkaline or alkaline earth metal battery 10 is placed on the sealant surface of a flexible plastic barrier sheet, which consists of a sealant layer of polyethylene, a moisture barrier layer of polypropylene, an oxygen barrier layer of ethylene vinyl alcohol and an outer moisture resistant layer of polypropylene. A second sheet of layered plastic as described above is placed on top of the battery, and the two sheets heat sealed in a dry inert atmosphere.

EXAMPLE II

A flat alkaline or alkaline earth metal battery 10 is placed on the sealant surface of a flexible plastic barrier sheet, which consists of a sealant layer of ethylene vinyl acetate (EVA), a moisture barrier layer of polypropylene, an oxygen barrier layer of ethylene vinyl alcohol and an outer moisture resistant and protective layer of an oriented polypropylene (OPP). A second sheet of layered plastic as described above is placed on top of the battery, and the two sheets heat sealed in a dry inert atmosphere.

EXAMPLE III

A flat alkaline or alkaline earth metal battery 10 is placed on the sealant surface of a flexible plastic barrier sheet, which consists of a sealant layer of polyethylene, a combination moisture barrier and oxygen barrier layer of polyvinylidiene chloride (PVDC) and an outer protective layer of oriented polyester (OPET). A second sheet of layered plastic as described above is placed on top of the battery, and the two sheets heat sealed in a dry inert atmosphere.

EXAMPLE IV

A flat alkaline or alkaline earth metal battery 10 is placed on the sealant surface of a flexible plastic barrier sheet, which consists of a sealant layer of polyethylene, a combination moisture barrier and oxygen barrier layer of polyvinylidiene chloride (PVDC) and an outer protective reinforcing layer of nylon. A second sheet of layered plastic as described above is placed on top of the battery, and the two sheets heat sealed in a dry inert atmosphere.

Multiple layers may be required to attain the protection desired, which may be more than four layers and can be up to nine layers.

It is thus apparent that packaging structures have been provided that achieve the objects of the invention.

I claim:

1. In combination with at least one flat battery cell having top and bottom surfaces, packaging construction which comprises a first sheet multi-layered plastic barrier structure in contact with said bottom surface of said cell, and a second sheet multi-layered plastic barrier structure in contact with said top surface of said cell and said first sheet.

2. In combination with at least one flat battery cell having top and bottom surfaces, packaging construction which comprises a first sheet multi-layer plastic barrier structure in adhesive contact with said bottom surface of said cell and a second sheet multi-layered plastic barrier structure in adhesive contact with said top surface of said cell and said first sheet.

3. Battery packaging construction as defined in claims 1 or 2 in which said first and second sheets are of at least three layered construction which includes, a sealant layer in contact with said cell, a water vapor barrier layer in contact with said sealant layer, and an oxygen barrier layer in contact with said water vapor barrier layer.

4. Battery packaging construction as defined in claims 1 or 2 in which said first and second sheets are of at least three layered construction which includes, a sealant layer in contact with said cell, an oxygen barrier layer in contact with said sealant layer, and a water vapor barrier layer in contact with said oxygen barrier layer.

5. Battery packaging construction as defined in claims 1 or in which said multi-layered sheets are co-extruded.

6. Battery packaging construction as defined in claims 1 or 2 in which said multi-layered sheets are laminated.

7. Battery packaging construction as defined in claim 3 in which a fourth layer is provided of reinforcing material.

8. Battery packaging construction as defined in claim 3 in which a fourth layer is provided of a barrier reinforcing material.

9. Battery packaging construction as defined in claims 1 or 2 in which said first and second sheets are joined by heat sealing.

10. Battery packaging construction as defined in claims 1 or 2 in which said first and second sheets are joined by adhesive sealing.

* * * * *